United States Patent [19]
Tsuboi et al.

[11] Patent Number: 5,973,780
[45] Date of Patent: Oct. 26, 1999

[54] ECHELLE SPECTROSCOPE

[75] Inventors: Naohiro Tsuboi; Fumikazu Oogishi, both of Kyoto, Japan

[73] Assignee: Shimadzu Corporation, Kyoto, Japan

[21] Appl. No.: 09/226,707

[22] Filed: Jan. 7, 1999

[30] Foreign Application Priority Data

Feb. 12, 1998 [JP] Japan ................................ 10-029517

[51] Int. Cl.$^6$ ................................................ G01J 3/18
[52] U.S. Cl. .......................................... 356/328; 356/305
[58] Field of Search ................................ 356/305, 326, 356/328, 334

[56] References Cited

U.S. PATENT DOCUMENTS 5,565,983 10/1996 Barnard ................................ 356/328

*Primary Examiner*—F. L. Evans
*Attorney, Agent, or Firm*—Majestic, Parsons, Siebert & Hsue P.C.

[57] ABSTRACT

An echelle spectroscope has one or more echelle diffraction gratings, one or more elements for separating dispersed light into portions corresponding to different orders of diffraction and one or more imaging means such as imaging mirrors but there is only one image detector. These components are so designed and arranged with respect to one another that the total range of wavelength to be analyzed is divided into a plurality of smaller ranges and the portions of the spectral light from a source corresponding to different ones of these divided wavelength ranges travel on different paths but would each form an image on the same image detector. A shutter is provided so as to selectively allow one of these portions of spectral light corresponding to one of different wavelength ranges to pass through.

14 Claims, 4 Drawing Sheets

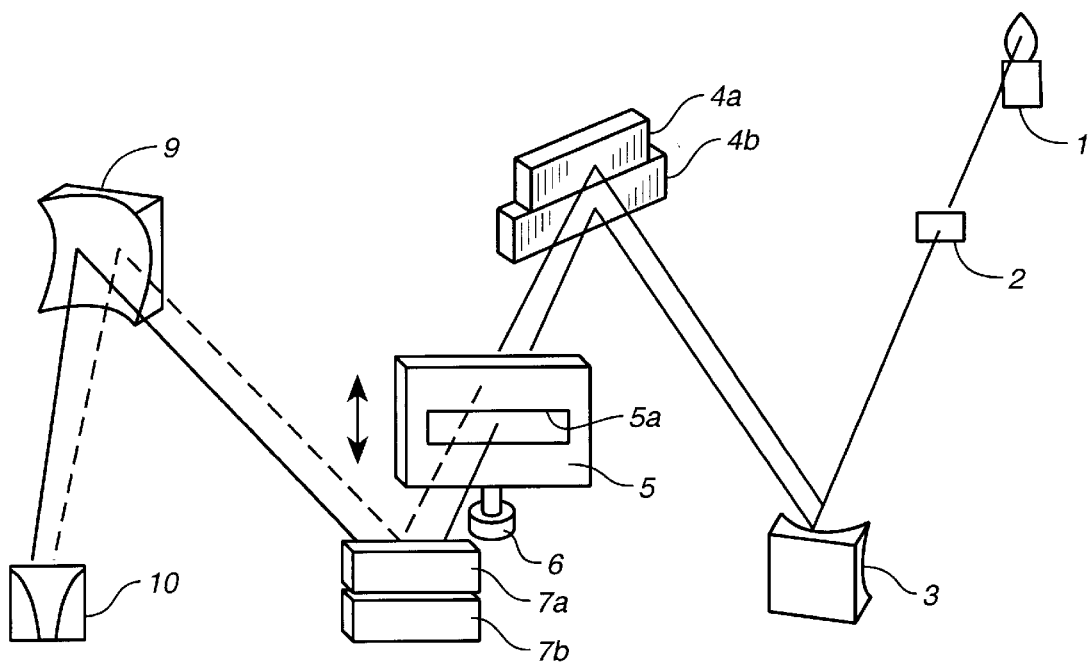
FIG._1
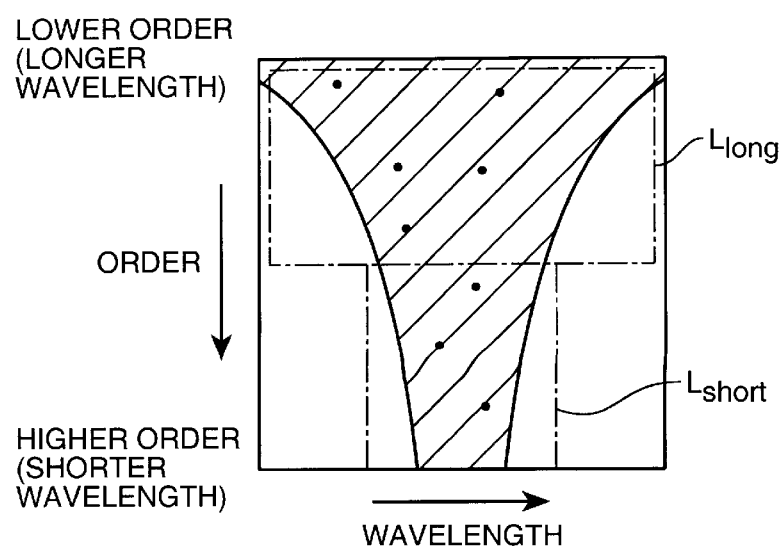
FIG._2

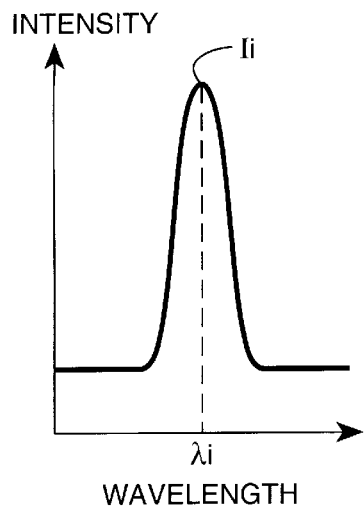
FIG._3A
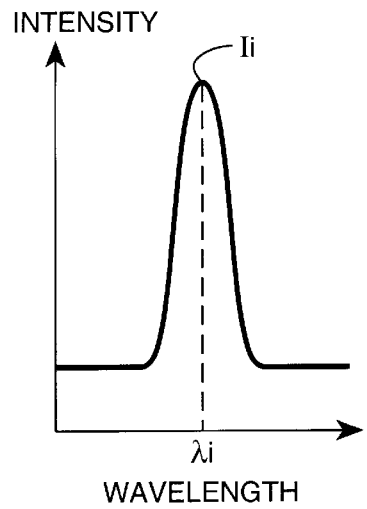
FIG._3B
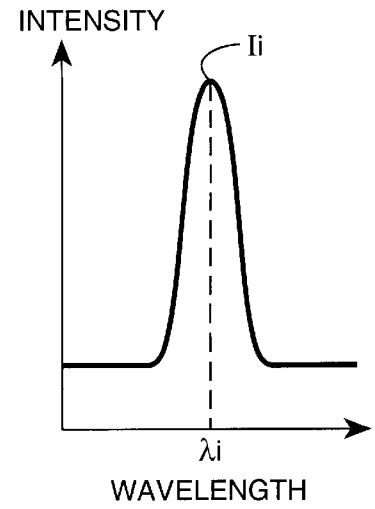
FIG._3C
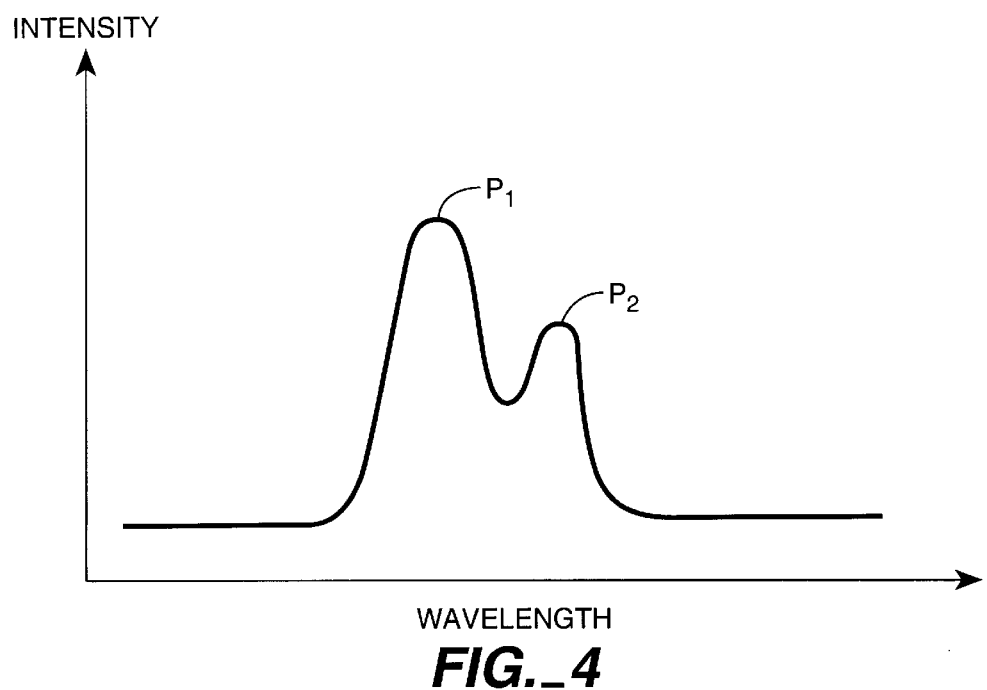
FIG._4

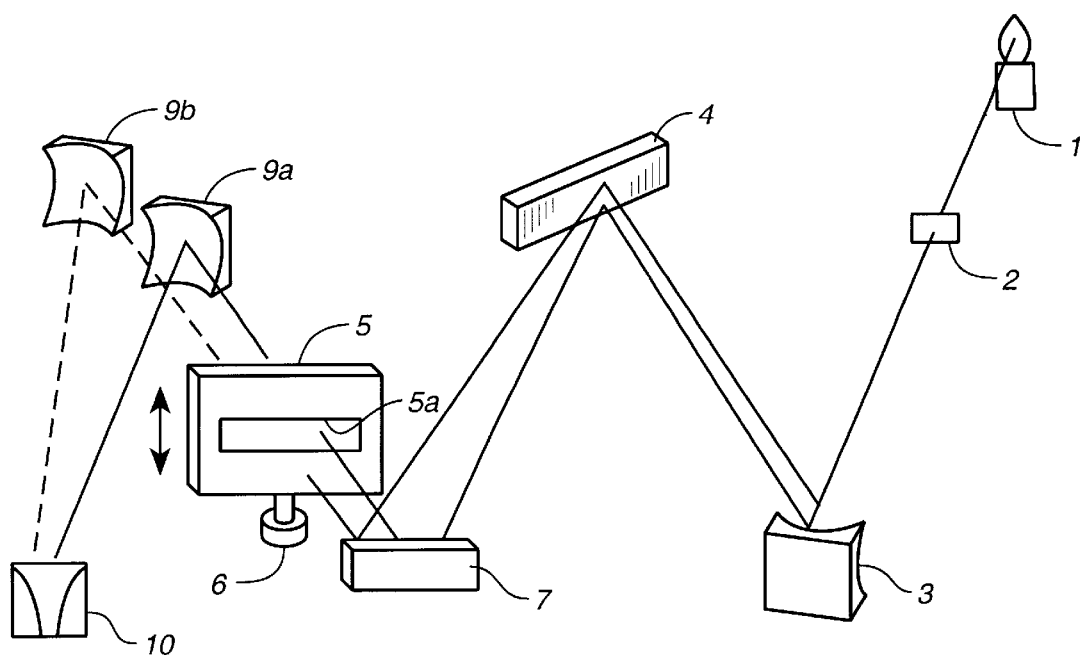
FIG._5
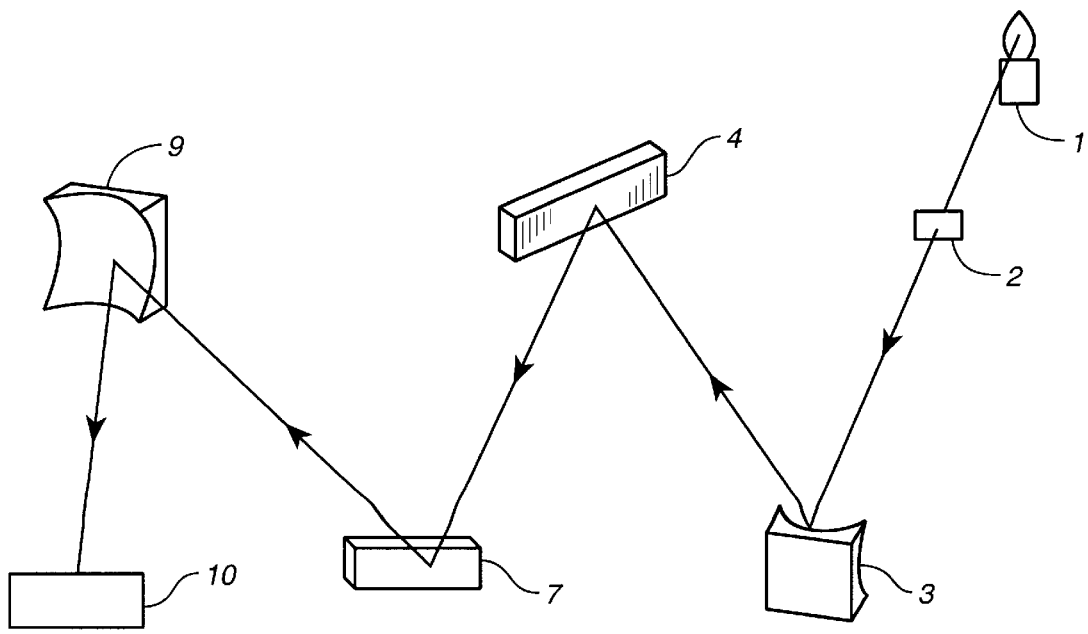
FIG._6
*(PRIOR ART)*

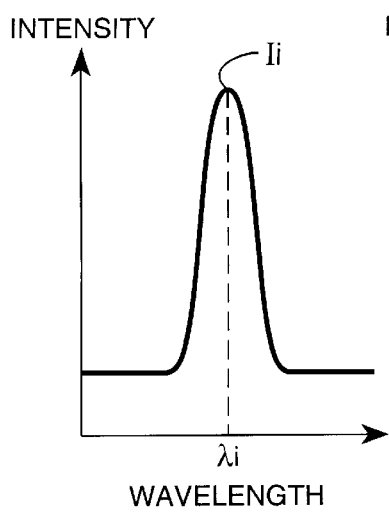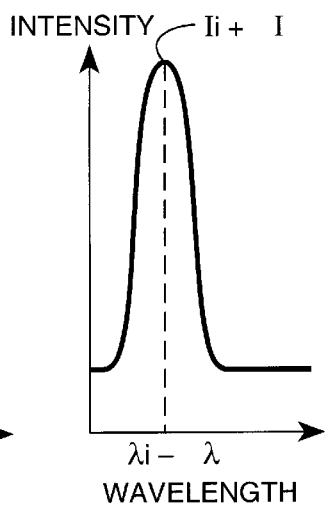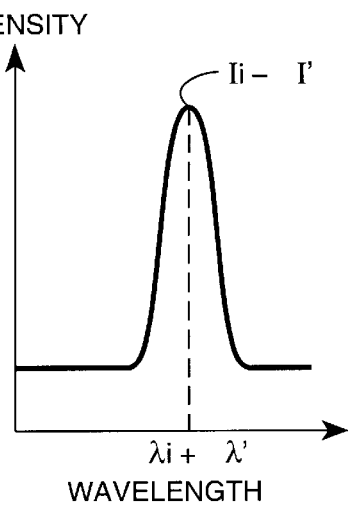
FIG._7A (PRIOR ART)  FIG._7B (PRIOR ART)  FIG._7C (PRIOR ART)

ECHELLE SPECTROSCOPE

BACKGROUND OF THE INVENTION

This invention relates to spectroscopes which are used in different kinds of apparatus for spectral analyses such as emission and absorption spectral analyses. In particular, this invention relates to echelle spectroscopes which make use of an echelle diffraction grating.

Echelle diffraction gratings for use as a light-dispersing element for an echelle spectroscope are conventionally designed so as to have a larger blaze angle θ than ordinary echelle diffraction gratings, their free spectral range being shorter on the short-wavelength side and longer on the long-wavelength side so as to provide high dispersion and high resolving power. On the other hand, it has been known to be advantageous to use an image detector comprising a CCD or an array of photo-diodes as a light detector for detecting spectral light dispersed by a diffraction grating because the spectral light of each wavelength is detected in units of pixels and hence the structure of the light detector can be made simpler than if a conventional photo-multiplier or the like is used for the detection of light.

FIG. 6 shows an example of conventional echelle spectroscope comprised as a combination of an echelle diffraction grating and an image detector having such characteristics according to the so-called Czerny-Turner type arrangement. Light from a source 1 is passed through an entrance slit 2 and is directed to an echelle diffraction grating 4 after it is made into a parallel beam by means of a collimation mirror 3. Since the dispersed light from the echelle diffraction grating 4 includes overlapping among spectral light portions of different orders, it is further dispersed by a separating element 7 into these spectral light portions of different orders in a direction perpendicular to the dispersion direction by the echelle diffraction grating 4. The separated spectral light portions thus obtained are then reflected by an imaging mirror 9 such that they form images on an image detector 10. An ordinary echellette grating or prism may be used as the aforementioned separating element 7.

With the image detector 10 in an arrangement as shown in FIG. 6, however, it is difficult, as a practical matter, to increase the length of its light-receiving surface due to technical limitations on the production of semiconductor elements. As a result, a high resolving power could not be obtained if a measurement was to be made over a wide range of wavelengths. It may be attempted to produce an element with a long light-receiving surface but such an element would be very expensive and, since the aberration would be large accordingly, it would not be a practical solution.

In view of the above, there have been attempts to provide means for spectral analyses over a wide range of wavelengths with a high resolving power. U.S. Pat. No. 4,820,048, for example, disclosed an arrangement of a plurality of image detectors in order to cover wavelengths over a wide range. Another attempt was to provide a mechanism for shifting an image detector in several steps in the direction of wavelengths of the spectral light. Each of these attempts, however, has its own problems. If a plurality of image detectors must be used, for example, the total cost of the apparatus becomes high. If the image detector must be shifted from one position to another, the mechanism for effecting the shift is required to have the accuracy on the order of less than several $\mu$m both in the horizontal and vertical directions in order to maintain reproducibility of the position of the spectral images. This again increases the overall cost of the apparatus. Since the shifting will be by mechanical means, furthermore, there will also arise the problem of stability. If an image detector with insufficient positional accuracy is shifted back and forth in the direction of the wavelength, the result of the measurements may in reality be as shown in FIGS. 7A, 7B and 7C due, for example, to a backlash, the actual measurements having been taken at slightly different wavelengths (with errors from the original wavelength $\lambda i$ shown by $\Delta\lambda$ and $\Delta\lambda'$) and thereby obtaining different measured intensities (with errors from the originally measured intensity Ii shown by $\Delta I$ and $\Delta I'$).

SUMMARY OF THE INVENTION

It is therefore an object of this invention to provide an improved echelle spectroscope with a high resolving power over a wide range of wavelength, capable of providing improved reproducibility of the results of measurement and improved stability.

According to this invention, a plurality of optical paths are provided between the echelle diffraction grating and the element for separating dispersed spectral light into portions corresponding to different orders of diffraction (hereinafter referred to as "the separating element"), as described above with reference to FIG. 6, according to the range of wavelengths, and the optical elements such as the echelle diffraction grating are arranged such that spectral light along each optical path will form an image on a same image detector. Since spectral light portions corresponding to different ranges of wavelengths form their images overlappingly all over the surface of the image detector, a shutter is disposed on the optical path such that only a selected optical path can be opened, depending on the range of wavelengths to be detected, while the other optical paths are closed, thereby allowing only the spectral light portion within the selected range of wavelengths forms an image on the image detector.

In this manner, the user has only to move the shutter and to switch the optical paths for forming a different image with the spectral light portions of wavelengths in a different range but on the same image detector. Thus, if the correspondence is preliminarily established between selected ranges of wavelengths and detected outputs from the image detector, it is possible to carry out spectral analyses over a wide range of wavelengths even with a relatively small image detector.

Since the selection of a range of wavelengths can be effected merely by moving the shutter, there is no need to alter the positional relationships among the optical elements such as the image detector and the echelle diffraction grating. Thus, the reproducibility of spectral images is not adversely affected by the shifting of the shutter.

An echelle spectroscope embodying this invention, with which the above and other objects can be accomplished, may therefore be characterized as comprising one or more echelle diffraction gratings, one or more separating elements for separating dispersed light into portions corresponding to different orders of diffraction and one or more imaging means such as imaging mirrors but there is only one image detector. These components are so designed and arranged with respect to one another that the total range of wavelength to be analyzed is divided into a plurality of smaller ranges and the portions of the spectral light from a source corresponding to different ones of these divided wavelength ranges travel on separate paths but would each form an image on the same image detector. A shutter is provided so as to selectively allow one of these portions of spectral light corresponding to one of the different wavelength ranges to pass therethrough. Thus, the spectral light over the entire range of wavelengths can be analyzed by means of a single image detector and without changing its position

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic drawing of the arrangement of an echelle spectroscope embodying this invention;

FIG. 2 is an echellogram showing the spectral characteristic of the echelle spectroscope;

FIGS. 3A, 3B and 3C are an example of measured results obtained by the spectroscope of FIG. 1 to show their reproducibility;

FIG. 4 is a graph for showing the resolving power of the spectroscope of FIG. 1 from its measured results;

FIG. 5 is a schematic drawing of another echelle spectroscope embodying this invention;

FIG. 6 is a schematic drawing of a prior art echelle spectroscope; and

FIGS. 7A, 7B and 7C are an example of measured results obtained by the prior art spectroscope of FIG. 6 to show their reproducibility.

Throughout herein, like or equivalent components are indicated by the same numerals even where they are components of different devices and may not necessarily be described repetitiously.

DETAILED DESCRIPTION OF THE INVENTION

FIG. 1 shows an echelle spectroscope embodying this invention, comprising a light source 1, an entrance slit 2, a collimation mirror 3, a single imaging mirror 9 serving as its imaging means and a single image detector 10, as described above with reference to FIG. 6. This echelle spectroscope is different from the prior art spectroscope of FIG. 6 firstly in that a plurality of echelle diffraction gratings 4a and 4b and as many separating elements 7a and 7b (two each in the example illustrated in FIG. 1) are provided, corresponding to ranges of wavelengths to be covered, and secondly in that there is also a shutter 5 with a window 5a for selecting each of the ranges of wavelengths. The number N of ruled lines and the blaze angle θ of each of the echelle diffraction gratings 4a and 4b are determined such that specified linear dispersion and resolving power can be obtained respectively within areas $L_{long}$ on the longer-wavelength side and $L_{short}$ on the shorter-wavelength side on the echellogram shown in FIG. 2.

In the case of an emission spectral analysis, for example, for which a high resolving power is required in a shorter-wavelength region, say, of an ultraviolet area with wavelengths less than 400 μm but no such resolving power is required in a longer-wavelength region, specifications of the echelle diffraction gratings 4a and 4b and the separating elements 7a and 7b are determined such that greater linear dispersion and higher resolving power can be obtained in the shorter-wavelength side than in the longer-wavelength side. Table 1 shows an example of such specifications when the image detector 10 is set for the opening of ½ inch-angle.

TABLE 1

| | Echelle gratings | | Separating element | Wavelength range | |
|---|---|---|---|---|---|
| | N (G/mm) | θ (deg) | N (G/mm) | (nm) | Image detector |
| $L_{short}$ | 44 | 70 | 300 | 170–400 | ½ inch-angle |
| $L_{long}$ | 31 | 63 | 50 | 400–800 | |

The echelle gratings 4a and 4b, the elements 7a and 7b and the imaging mirror 9 are arranged with respect to one another in such a way that the spectral light portion with shorter wavelengths (in range $L_{short}$) from the grating 4a, made incident on element 7a and the spectral light portion with longer wavelengths (in range $L_{long}$ from the grating 4b, made incident on element 7b, are both reflected by the single imaging mirror and each form an image on the same image detector 10.

The shutter 5 is provided because, without this shutter 5 present, the spectral light portions with wavelengths in both ranges $L_{long}$ and $L_{short}$ would form mutually overlapping images all over the surface of the image detector 10. According to the example illustrated in FIG. 1, the shutter 5 is disposed on a part of the optical path between the echelle diffraction gratings 4a and 4b and the separating elements 7a and 7b such that it will be shifted to a first position when shorter wavelengths (in range $L_{short}$) are being measured by allowing only the spectral light portion dispersed by the grating 4a to pass therethrough and to a second position when longer wavelengths (in range $L_{long}$) are being measured by allowing only the spectral light portion dispersed by the other grating 4b to pass therethrough. In FIG. 1, numeral 6 indicates a driving mechanism including a motor and gears for moving the shutter 5 between the aforementioned two positions.

With the echelle spectroscope thus structured, light from the light source 1 is passed through the entrance slit 2 and, after it is made into a parallel beam by means of the collimation mirror 3, is made incident on the echelle diffraction gratings 4a and 4b. The spectral light portions dispersed by the echelle diffraction gratings 4a and 4b are directed respectively towards the elements 7a and 7b. If the spectral light portion in the shorter-wavelength range $L_{short}$ is to be measured, the driving mechanism 6 is activated so as to move the shutter 5 such that only the light being directed from the grating 4a to the element 7a will pass through the window 5a. Similarly, if the spectral light in the longer-wavelength range $L_{long}$ is to be measured, the driving mechanism 6 is activated so as to move the shutter 5 such that only the light being directed from the grating 4b to the element 7b will pass through the window 5a. In either case, the spectral light which has passed through the window 5a is dispersed by the corresponding one of the elements 7a or 7b in a direction perpendicular to the direction of dispersion by the echelle dispersion gratings 4a and 4b, diffracted portions of light of different orders being separated. The dispersed spectral light of a selected order is then reflected by the imaging mirror 9 and forms an image on the image detector 10.

In summary, the range of wavelengths $L_{long}$ or $L_{short}$ in the spectral light to be examined is selected according to this invention by moving the shutter 5. Thus, although the image detector 10 may not be able detect all at once the entire range of wavelengths which are to be analyzed, it is possible to determine by switching the position of the shutter 5 whether the output being received from the image detector corresponds to the shorter-wavelength range $L_{short}$ or the longer-wavelength range $L_{long}$. In this manner, a result of measurement over the entire range of wavelengths (both $L_{short}$ and $L_{long}$) can be obtained by using the single image detector 10.

Since the image detector 10 remains at a fixed position while only the shutter 5 is moved to switch the optical path, the positional relationship among the optical components of the spectroscope does not change. This makes it possible to obtain stable results of measurement with good reproducibility. Although the shutter 5 is moved, a same intensity value Ii is obtained corresponding to a same wavelength value λi as shown in FIGS. 3A, 3B and 3C because the image detector 10 remains at a fixed position.

The echelle diffraction gratings 4a and 4b and the separating elements 7a and 7b are designed such that a larger linear dispersion and a higher resolving power can be obtained in the shorter-wavelength region than in the longer-wavelength region. This makes it possible, as shown in FIG. 4 for example, to measure peaks $P_1$ and $P_2$ at the wavelengths of Cd and As separately.

FIG. 5 shows another echelle spectroscope embodying this invention which is different from the spectroscope described above with reference to FIG. 1 in that it uses only one echelle grating 4 and one separating element 7 but is provided with a plurality of imaging mirrors (two mirrors in the example illustrated in FIG. 5) 9a and 9b, serving as imaging means arranged such that their focal lengths $f_a$ and $f_b$ correspond to different ranges of wavelengths.

Explained more in detail, the focal lengths $f_a$ and $f_b$ of the two imaging mirrors 9a and 9b are determined such that these two mirrors 9a and 9b will each provide a specified linear dispersion respectively inside the short-wavelength region $L_{short}$ and inside the long-wavelength region $L_{long}$ shown in the echellogram of FIG. 2. A shutter 5 with a window 5a is disposed according to this embodiment of the invention on the optical path between the single separating element 7 and the imaging mirrors 9a and 9b and is adapted to allow only spectral light with shorter wavelengths separated by the separating element 7 to pass through the window 5a when the measurement is for shorter-wavelength light and to allow only spectral light with longer wavelengths separated by the same separating element 7 to pass through the window 5a when the measurement is for longer-wavelength light.

The echelle grating 4, the separating element 7 and the imaging mirrors 9a and 9b, as well as their positional relationships are determined such that the spectral light portion with wavelengths in each of the wavelength ranges ($L_{short}$ or $L_{long}$ selected by the position of the shutter 5 will form an image, after reflected by the corresponding one of the imaging mirrors 9a and 9b, on the same image detector 10.

In other respects, the structure of the spectroscope shown in FIG. 5 is identical to that described with reference to FIG. 1 and hence a detailed description will be omitted.

With the echelle spectroscope shown in FIG. 5, too, light from the light source 1 is passed through the entrance slit 2 and, after it is made into a parallel beam by means of the collimation mirror 3, is made incident on the echelle diffraction grating 4. The spectral light dispersed by the grating 4 is directed to the separating element 7 by which it is dispersed further in a direction perpendicular to the direction of dispersion by the grating 4 into separate spectral light portions corresponding to different orders of diffraction. Depending on whether the spectral light portion with wavelengths in the shorter-wavelength range $L_{short}$ or in the longer-wavelength range $L_{long}$ has been selected by the positioning of the shutter 5, the spectral light passing through the window 5a is reflected by the imaging mirror 9a or 9b but forms an image on the same image detector 10 without regard to which of the imaging mirrors 9a and 9b reflected it.

Although the invention has been described above with reference to only two examples, these two examples are not intended to limit the scope of the invention. Many modifications and variations are possible within the scope of the invention, although not separately illustrated. Regarding the first embodiment of the invention described with reference to FIG. 1 above, for example, the shutter 5 may be disposed instead between the collimation mirror 3 and the echelle diffraction gratings 4a and 4b. Similarly, the plurality of separating elements 7a and 7b may be replaced by a single element while the orientations of the individual echelle gratings 4a and 4b are varied such that their optical relationships allow spectral light portions with wavelengths in the shorter-wavelength and longer-wavelength ranges $L_{short}$ and $L_{long}$ to each form an image on the same image detector 10. The number of echelle gratings 4a and 4b in the first embodiment of the invention and the number of imaging mirrors 9a and 9b in the second embodiment of the invention need not be two, but may be further increased in order to improve the resolving power. In summary, all such modifications and variations that may be apparent to a person skilled in the art are intended to be included within the scope of the invention.

Many advantages are gained by the present invention. Firstly, spectral light with wavelengths over a wide range can be analyzed by means of a relatively small image detector because each spectral light portion with wavelengths within any selected one of different ranges forms an image on the same image detector. As a result, the resolving power of wavelengths is improved, and analyses with a high level of accuracy become possible. Secondly, since the image detector is no longer required to undergo a step-wise motion, as in the case of some prior art spectroscopes, the optical system is stabilized and the reproducibility of the measured results is improved. Thirdly, since only one relatively small image detector is required, the overall cost of the spectroscope can be prevented from rising.

What is claimed is:

1. An echelle spectroscope comprising:

a plurality of echelle diffraction gratings;

a single image detector;

separating means for separating spectral light dispersed by said echelle diffraction gratings into spectral light portions corresponding to different orders of diffraction;

imaging means for forming images of said spectral light portions on said single image detector; and a shutter which is to be moved for selecting any one of a plurality of ranges of wavelength and allowing only spectral light with wavelengths within a selected one of said ranges to pass therethrough;

said echelle diffraction gratings, said separating means and said imaging means being arranged such that spectral light with wavelengths within any of said ranges forms an image on said single image detector.

2. The echelle spectroscope of claim 1 wherein said separating means comprises a plurality of elements each associated with a different one of said echelle diffraction gratings, dispersed light from each of said echelle diffraction gratings being directed to and dispersed by an associated one of said elements.

3. The echelle spectroscope of claim 2 wherein each spectral light dispersed by one of said elements and directed to said imaging means forms an image on said single image detector.

4. The echelle spectroscope of claim 1 wherein said shutter is disposed between said echelle diffraction gratings and said separating means.

5. The echelle spectroscope of claim 2 wherein said shutter is disposed between said echelle diffraction gratings and said separating means.

6. The echelle spectroscope of claim 3 wherein said shutter is disposed between said echelle diffraction gratings and said separating means.

7. The echelle spectroscope of claim 1 further comprising a driving mechanism for moving said shutter according to a selected one of said ranges.

8. The echelle spectroscope of claim 4 further comprising a driving mechanism for moving said shutter according to a selected one of said ranges.

9. The echelle spectroscope of claim 5 further comprising a driving mechanism for moving said shutter according to a selected one of said ranges.

10. The echelle spectroscope of claim 6 further comprising a driving mechanism for moving said shutter according to a selected one of said ranges.

11. An echelle spectroscope comprising:

a single echelle diffraction grating;

a single image detector;

separating means for separating spectral light dispersed by said echelle diffraction gratings into spectral light portions corresponding to different orders of diffraction;

a plurality of imaging means each having a different focal length for forming on said single image detector an image of a different one of said spectral light portions corresponding to one of said different orders of diffraction; and a shutter which is to be moved for selecting any one of a plurality of ranges of wavelength and allowing only one of said spectral light portions with wavelengths within a selected one of said ranges to pass therethrough;

said echelle diffraction gratings, said separating means and said plurality of imaging means being arranged such that any of said spectral light portions with wavelengths of any of said ranges forms an image on said single image detector.

12. The echelle spectroscope of claim 11 wherein said shutter is disposed between said separating means and said plurality of imaging means.

13. The echelle spectroscope of claim 11 further comprising a driving mechanism for moving said shutter according to which of said ranges has been selected.

14. The echelle spectroscope of claim 12 further comprising a driving mechanism for moving said shutter according to which of said ranges has been selected.

* * * * *